United States Patent
Hardy

(10) Patent No.: US 10,284,724 B2
(45) Date of Patent: May 7, 2019

(54) CONTEXT SENSITIVE RULE-BASED ALERTS FOR FRAUD MONITORING

(71) Applicant: Teleperformance SE, Paris (FR)

(72) Inventor: Lyle Hardy, Holladay, UT (US)

(73) Assignee: TELEPERFORMANCE SE, Paris (FR)

(*) Notice: Subject to any disclaimer, the term of this patent is extended or adjusted under 35 U.S.C. 154(b) by 0 days.

(21) Appl. No.: 15/480,230

(22) Filed: Apr. 5, 2017

(65) Prior Publication Data

US 2018/0295238 A1 Oct. 11, 2018

(51) Int. Cl.
*H04M 3/51* (2006.01)
*H04L 29/06* (2006.01)
*G06F 21/31* (2013.01)
*G10L 15/18* (2013.01)
*G10L 25/63* (2013.01)
*H04M 3/22* (2006.01)
*G10L 15/08* (2006.01)

(52) U.S. Cl.
CPC ........ *H04M 3/5175* (2013.01); *G06F 21/316* (2013.01); *G10L 15/1822* (2013.01); *G10L 25/63* (2013.01); *H04L 63/1408* (2013.01); *H04M 3/2281* (2013.01); *H04M 3/51* (2013.01); *G10L 2015/088* (2013.01); *H04M 2203/6027* (2013.01)

(58) Field of Classification Search
CPC ............. H04M 3/5175; H04M 3/5183; H04M 3/42221; H04M 3/2281; H04M 2203/30; G06F 21/316
See application file for complete search history.

(56) References Cited

U.S. PATENT DOCUMENTS

| | | | |
|---|---|---|---|
| 9,203,962 B2* | 12/2015 | Guerra | G06Q 50/01 |
| 2014/0136194 A1* | 5/2014 | Warford | G10L 17/02 704/233 |
| 2016/0065732 A1* | 3/2016 | Davis | H04M 3/51 379/265.02 |
| 2016/0142534 A1 | 5/2016 | Guerra et al. | |
| 2017/0133017 A1* | 5/2017 | Rajakumar | G10L 17/06 |

* cited by examiner

*Primary Examiner* — Nafiz E Hoque

(57) ABSTRACT

According to embodiments of the present invention, various computer implemented methods are provided for generating context sensitive alerts for the purposes of fraud detection and prevention. According to one embodiment, a communication (e.g., a call) is received at (or initiated by) a workstation by a human representative or agent. Verbal (voice) communication between the agent and the third party customer is monitored and converted into text. The agent's activity in applications executing in the workstation is also tracked. The combination of converted text and the activity of the agent is evaluated in a behavior engine to detect inconsistencies between the activity of the agent and authorized or typical activity. When inconsistencies are detected, security actions are performed to alert administrators of potential fraud and, in extreme cases, further action by the agent may be prevented in the workstation to prevent additional fraud.

20 Claims, 6 Drawing Sheets

Exemplary Computer System 100

CONTEXT SENSITIVE RULE-BASED ALERTS FOR FRAUD MONITORING

BACKGROUND

Many businesses and organizations offer services to consumers and other clientele remotely. While a growing portion of these services are becoming automated, human interaction is often preferred (and sometimes necessary) for more difficult or complex cases. Naturally, many businesses and organizations employ human representatives to provide (technical) support and/or information to inquiring consumers and other interested parties regarding products and/or services. To handle large volumes of requests, a typical approach is to use one or more contact centers staffed by human agents. Many individualized contact centers are centralized to provide sufficient space and resources for many agents working simultaneously. For example, a larger contact center may support hundreds or thousands of workstations in a single building or campus of buildings. In that manner, maintenance and installation of all of the infrastructure (e.g., computers, workstation cubicle, etc.) is centralized.

These contact centers typically handle the large volumes of service or fulfillment requests by telephone (or communication technologies that simulate a telephonic communication). Typically, agents will answer calls in the order they are received, and when the number of available agents is surpassed by the number of pending calls, a chronological queue is formed that agents may respond to whenever available (e.g., a previous call is completed).

A popular example of a contact center is an inbound contact center that manages incoming calls to provide services to incoming callers. For example, an inbound contact center may provide support to complete a sale, handle issues with or questions regarding products (e.g., installation instructions, warranty service, etc.), handle calls related to services (e.g., banking, collections, police, fire, alarm, etc.), and other similar types of services. Another example of a contact center is an outbound contact center that initiates calls. An outbound contact center may provide telemarketing for a product or service, enable the solicitation of charitable or political donations, provide debt collection services, perform polling or market research, etc.

A contact center may be operated by the business or organization associated with the product or service, or a third party employed to provide customer support. The contact center may represent a third party client, wherein the agent handles calls from customers on behalf of the third party client. As such, the agent may be authorized to access privileged client information using the client's databases. For example, the client may be a banking institution and the agent is handling a call to help a customer determine their account balance. In such instances, the agent can access the customer's personal data controlled by the banking institution to provide an account balance.

However, there are instances where the agent is accessing privileged customer information when there is no legitimate need, or is accessing the information for nefarious purposes. That is, while a contact center agent inherently has authorized access to personal and identifiable information, the agent is generally empowered only to use this access on a need to access basis. However, without active monitoring and user access control, not only may the agent be gathering critical personal information through unauthorized access, but that information may be later used to commit additional fraud (e.g., applying for credit, making purchase transactions, etc.).

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to embodiments of the present invention, various computer implemented methods are provided for generating context sensitive alerts for the purposes of fraud detection and prevention. According to one embodiment, a communication (e.g., a call) session is initiated at (or received by) a workstation by a human representative or agent. Verbal communication between the agent and the third party customer is monitored and converted into text using automatic speech recognition (ASR) techniques. The agent's activity in applications executing in the workstation is also tracked. The combination of converted text and the activity of the agent is evaluated in a behavior engine to detect inconsistencies between the activity of the agent and authorized or typical activity. When inconsistencies are detected, security actions are performed to alert administrators of potential fraud and, in extreme cases, further action by the agent may be prevented in the workstation to prevent additional fraud. In further embodiments, when the potential fraudulent activity is detected, the method includes collecting electronic evidence of the first workstation, wherein the evidence may be used to prove actual fraud by the agent.

According to another embodiment, a method for analyzing call activity for detect potential fraudulent behavior is provided. In one or more embodiments, the method is performed by analyzing a transcript of verbal communication between an agent and a third party customer and a log of agent activity in a behavior engine, detecting potential fraudulent activity from the analyzed data, identifying preventative measures commensurate to the potential fraudulent activity detected, and transmitting preventative measures to a remote workstation to perform once potential fraudulent activity is detected.

According to yet another embodiment, a computer implemented method for submitting agent activity performed at a workstation for analysis is provided. In one or more embodiments, the method is performed by detecting a call session at a workstation corresponding to an contact center agent, monitoring the call activity that includes verbal communication between the agent and the third party corresponding to the call session, converting the monitored verbal communication to text, sending the converted text and a log of the agent's activity during the call session to a communicatively coupled behavior engine, receiving a notification of a detected inconsistency between the monitored verbal communication and the log of agent activity and one or more security actions, and performing the security actions in response to receiving the notification of the detected inconsistency.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
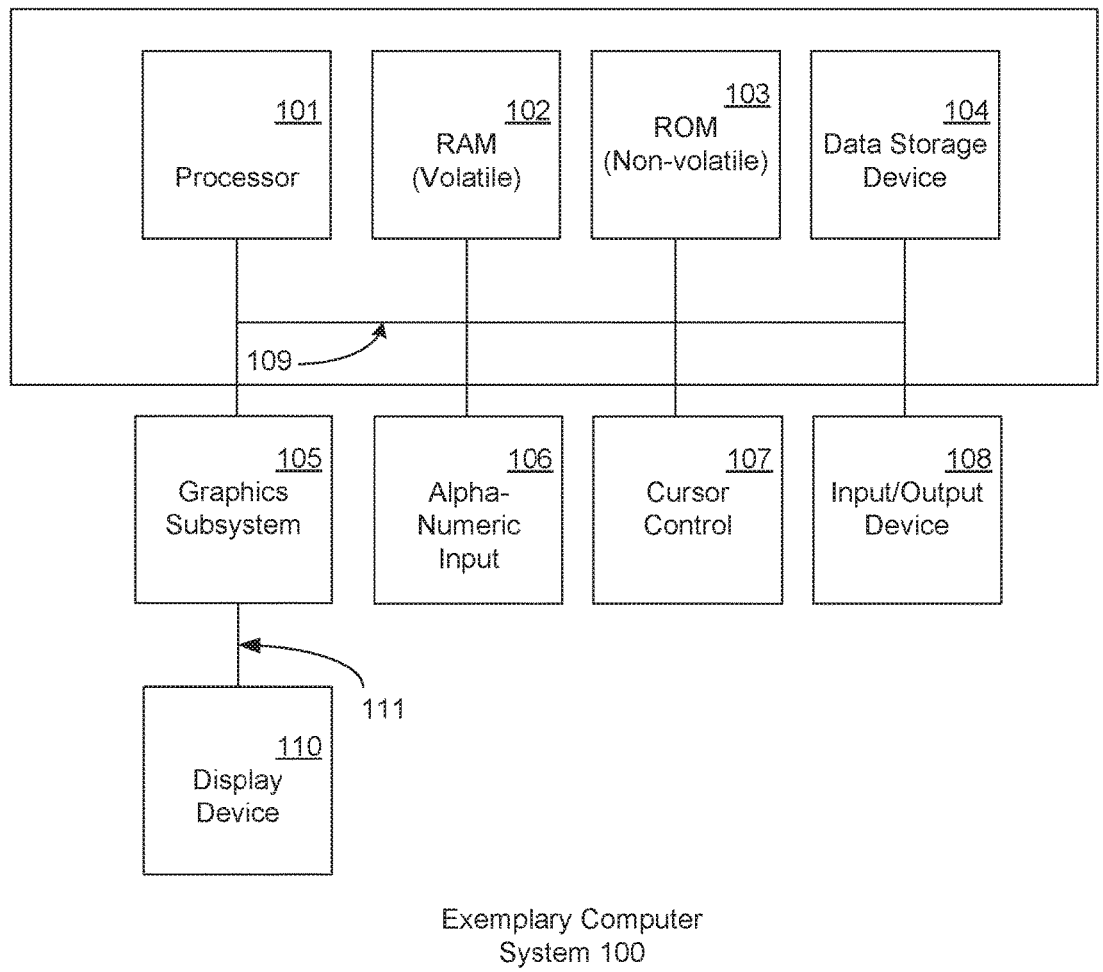
FIG. 1 depicts a block diagram of an exemplary computer system suitable for implementing embodiments according to the present disclosure.

Reference will now be made in detail to several embodiments. Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Embodiments of the present invention are described within the context of a contact center, e.g., a contact center used to facilitate interactions and/or communications between agents and customers through a telephone network, such as handling incoming and outgoing calls. In one or more embodiments, a contact center is employed to provide services to customers on behalf of a third party client through various systems and methods of interacting and/or communicating with the client. A typical configuration of a contact center includes, for example, a centralized location remotely located from a substantial portion—if not vast majority—of the customers or clients that contribute to the call volume. For example, for contact centers operating under the purview of a banking institution, rather than using bank employees, the institution may be a client of a third party provider that operates the contact center, and contracts with the contact center to provide banking services to its customers. In such an example, at least a portion of the personal banking services conducted over telephone or other long distance communication channels are provided by the agents of the contact center via direct interaction with the customers.

According to one or more embodiments, a contact center is able to support interaction and/or communication between an agent and a customer along one or more communication channels. One type of interaction involves telephone communications between an agent and a customer through a phone network (e.g., mobile, public switched network, combinations of mobile and public switched network, etc.). Other types of interactions and/or communications between an agent and a customer also include, but are not limited to: video conferencing, text, text messaging, internet based communications, etc.

Contact centers by design allow employed agents to access personal and identifiable information customers of clients that are maintained by the corresponding clients. For example, a client that is a bank may store personal information used to identify customers, and other banking information related to the customer (e.g., customer assets, etc.), while another client (e.g., insurance company, health care provider, and others) may have access to health records of individual employees and/or customers. Because that information (e.g., financial and health) is readily accessible, an agent may potentially use that information for personal gain. For example, an agent may apply for credit using information related to a customer, an agent may purchase online items using credit card information associated with a customer, or an agent may sell personal health information of a well-known customer.

To address these problems, embodiments of the present invention provide for the ability to identify, collect evidence and prevent fraudulent activity performed by contact center agents during the fulfillment of normal contact center operations. Other embodiments of the present invention provides the ability to alert system administrators when potential fraudulent activity is detected, and/or block further/continued fraudulent contact center agent access to customer personal and identifiable information.

Embodiments of the present invention describe techniques for detecting potential fraudulent activity based on information collected by monitoring call activity during call sessions (e.g., service or information requests, etc.), and comparing the activity and behavior of the agent receiving potentially sensitive or financially valuable information to well-defined examples of appropriate behavior, or alternately to potentially fraudulent behavior. For example, certain activity may match a pattern of activity known to be associated with fraudulent activity. In still other examples, when the activities of an agent are outside the statistical norms associated with a group of agents, such activity may indicate potential fraudulent activity. Once potential fraudulent activity by an agent has been flagged, additional investigation may be conducted to determine whether actual fraudulent activity has been conducted, and further security measures for prevention may be employed. In addition to active and direct prevention (e.g., disabling further agent activity), fraudulent activity can be deterred by the understanding that the activity of the agents are being monitored, fraudulent behavior can be successfully detected, and that fraudulent activity is subject to the risk of criminal prosecution.

While the following example configurations are shown as incorporating specific, enumerated features and elements, it is understood that such depiction is exemplary. Accordingly, embodiments are well suited to applications involving different, additional, or fewer elements, features, or arrangements.

Exemplary Computer System

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 typically includes at least one processing unit 101 and memory, and an address/data bus 109 (or other interface) for communicating information. Depending on the exact configuration and type of computing system environment, system memory generally represents any type or form of volatile or non-volatile storage device or medium capable of storing data and/or other computer-readable instructions. Examples of system memory include, without limitation, volatile (such as RAM 102), non-volatile (such as ROM 103, flash memory, etc.), or any other suitable memory device. In one or more embodiments, The memory can include a frame buffer for storing pixel data drives a display device 110.

The computer system 100 may also comprise an optional graphics subsystem 105 for presenting information to a user, e.g., by displaying information on an attached display device 110, connected by a video cable 111. According to embodiments of the present claimed invention, the graphics subsystem 105 may be coupled directly to the display device 110 through the video cable 111. In alternate embodiments, display device 110 may be integrated into the computing system (e.g., a laptop or netbook display panel) and will not require a video cable 111.

Additionally, computing system 100 may also have additional features/functionality. For example, computing system 100 may also include additional storage (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules or other data. RAM 102, ROM 103, and external data storage device (not shown) are all examples of computer storage media.

Computer system 100 also comprises an optional alphanumeric input device 106, an optional cursor control or directing device 107, and one or more signal communication interfaces (input/output devices, e.g., a network interface card) 108. Optional alphanumeric input device 106 can communicate information and command selections to central processor 101. Optional cursor control or directing device 107 is coupled to bus 109 for communicating user input information and command selections to central processor 101. Signal communication interface (input/output device) 108, also coupled to bus 109, can be a serial port. Communication interface 108 may also include wireless communication mechanisms. Using communication interface 108, computer system 100 can be communicatively coupled to other computer systems over a communication network such as the Internet or an intranet (e.g., a local area network).

In some embodiments, a computer-readable medium containing a computer program may be loaded into computing system 100. All or a portion of the computer program stored on the computer-readable medium may then be stored in system memory and/or various portions of storage devices. When executed by processing units 101 and/or 105, a computer program loaded into computing system 100 may cause processor 101 and/or 105 to perform and/or be a means for performing the functions of the example embodiments described and/or illustrated herein. Additionally or alternatively, the example embodiments described and/or illustrated herein may be implemented in firmware and/or hardware.

Figure 2:
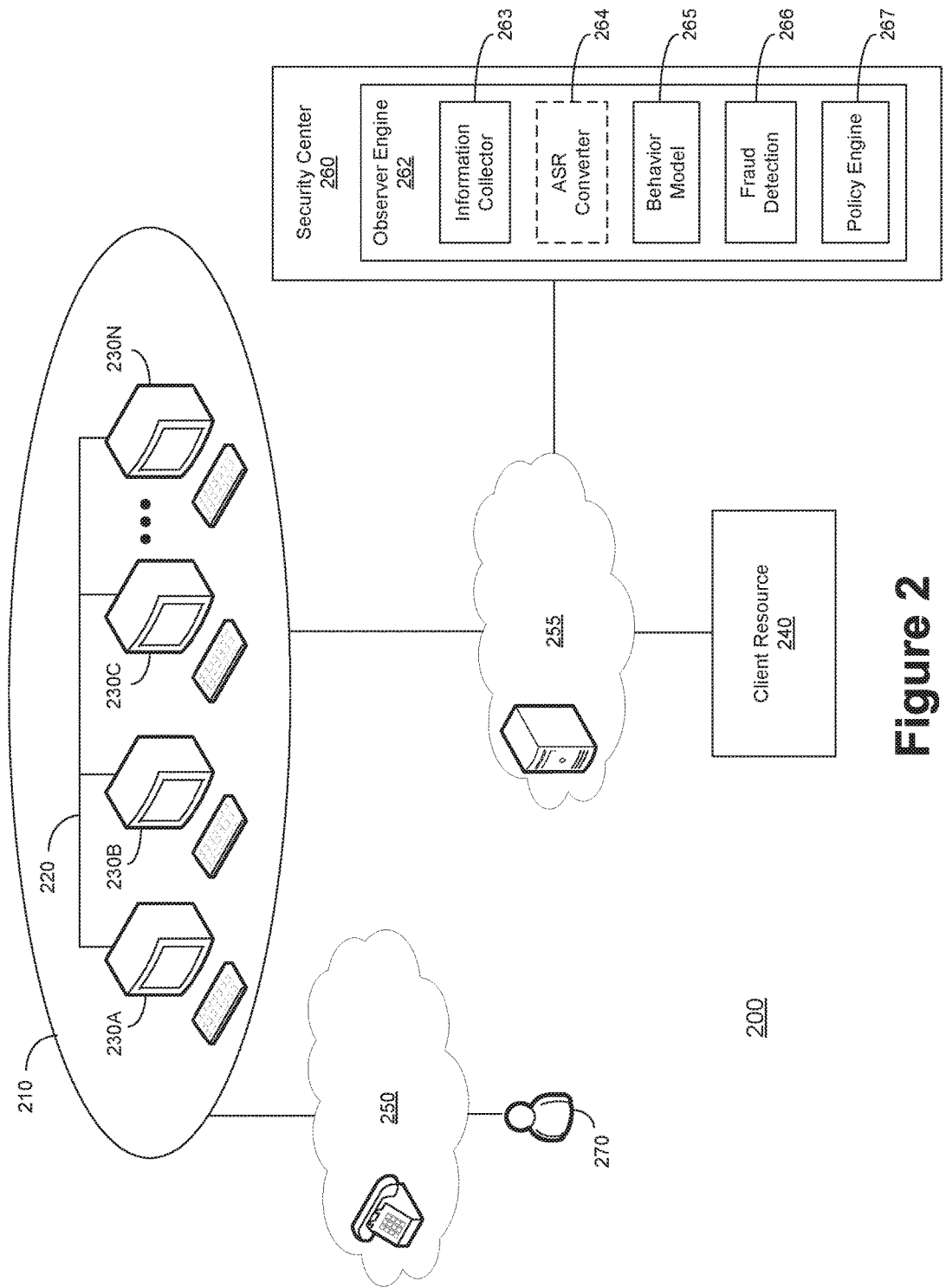
FIG. 2 is an illustration of a system configured for identifying potential fraudulent activity performed by an agent within a contact center, and taking preventative action once the activity is identified, in accordance with one embodiment of the present disclosure.

FIG. 2 is an illustration of a system 200 for monitoring agent activity based on converted verbal communication performed between an agent and a customer (caller) to detect potential fraudulent activity performed by an agent within a contact center, in accordance with embodiments of the present disclosure. One or more components of system 200 may be implemented by, for example, the computing system 100 of FIG. 1 for purposes of monitoring activity of agents and/or workstations to identify potential fraudulent activity and to perform additional actions once the activity is detected, in accordance with one embodiment of the present disclosure.

According to one or more embodiments, System 200 includes a contact center 210 operated by one or more agents of a business or organization to handle interactions with customers of the business or organization. In alternate embodiments, the contact center may operate on behalf of a client business or organization and managed by a third party service purveyor. According to such embodiments, agents may be trained and tasked with providing support and information to one or more customers 270 regarding products and/or services associated with a client business or organization. In addition to responding to requests for support and information, tasks that agents of contact center 210 may perform include (but are not limited to): helping a customer complete a sale of a product or service, assisting a customer with accessing information managed by the client, or cooperatively guiding the customer to handle issues and problems with products or services provided or offered by the client.

Customers 270 may interact with agents at workstations 230 through one or more communication networks 250 and 255. For example, communication network 255 may include a system of interconnected computer networks (e.g., internet) that allow for direct communication between a customer and a client. Also, communication network 250 may be any combination of phone networks that are configured to connect a customer to an agent at a particular workstation, such as a mobile phone network, a land-line based public switched telephone network (PSTN), etc.

According to one or more embodiments, the contact center 210 may include a network 220 of workstations 230, including workstations 230A-N, each workstation being attended to by one or more agents. In one or more embodiments, a workstation can be compartmentalized as a scalable unit, and is configured to provide essential resources that an agent utilizes to handle requests by a customer on behalf of a client. For example, a workstation may integrate a computing system (not shown), and telephone component (not shown) on an individual working platform. By providing an infrastructure that includes substantial workstation and human (agent) resources, a contact center 210 is able to efficiently install and maintain large call volumes. In addition, by providing a centralized location for workstations, agents have ready access to information, resources, and supervisors to help achieve and maintain the highest quality of service to the customers of the client.

As depicted in FIG. 2, each workstation computing system is configured to access at least one resource 240 of a client over a communication network 255. For example, the workstation computing system may execute a client-operated application that is configured to access a database containing information related to customer's of the client business or organization. The workstation computing system may also be configured to provide communication between a customer and an agent at the workstation. For example, the communication may include internet based voice communications, navigation of a shared website accessed simultaneously and in conjunction by the customer and the agent, text based communication, etc. In one or more embodiments, the telephone component of a workstation is configured to provide communication (e.g., voice) between a customer and an agent attending to the workstation. For example, the telephone component may be coupled to a corresponding phone of the customer via communication network 250 and/or network 255.

As presented in FIG. 2, a fraud monitoring system in a contact center 210 such as system 200 also includes a security center 260 that is communicatively coupled to the plurality of workstations 230 of contact center 210, and is configured to receive information related to activities being performed by agents on a plurality of computing systems associated with the workstations 230. In one embodiment, the security center 260 may be implemented as one or more computing devices (e.g., servers) that include one or more processing units, one or more storage and memory devices, and one or more display devices. The one or more processing units may execute programmed instructions stored in the one or more memory devices to implement an observer engine 261 that continuously receives and processes information from workstations at one or more contact centers. For instance, an information collector module 263 of the observer engine 261 is communicatively coupled to each of the workstations 230A-N, and is configured to receive information that can be used to monitor activity of agents and can be used to determine when potential fraudulent activity is being performed. The information may be stored in a storage on the security center 260 for later access, such as when performing analysis on the information at a later time.

In one or more embodiments, the information collected by information collector module 263 includes a converted transcript of the verbal communication between a customer and the servicing agent, as well as a log of the activity of the agent that is performed responsive to (i.e., that occurs temporally proximate to) the verbal communication. In one or more embodiments, the speech to text conversion may be performed locally at the workstation of the agent, e.g., by a security application associated with the observer engine executing on the computing system of the workstation. The speech may be converted and streamed in real-time or in discrete portions (chunks) from the workstation. According to alternate embodiments, the verbal communication itself may be recorded and transmitted, either in real-time (e.g., streamed) or in discrete portions (chunks) to the security center 260 and converted in an ASR convert 264 implemented by the observer engine 261.

In one embodiment, fraud detection may be performed locally at a corresponding monitor of a workstation, or may be performed remotely at the security center 260, wherein the detection is based on the information collected from a corresponding observer application executing in the corresponding workstation. For example, security center 260 may include a fraud detection unit 266 that is configured for detecting potential fraudulent activity being performed by an agent at a workstation. In another embodiment, the fraud detection unit is located at a workstation, wherein the detection and subsequent measures taken are controlled locally at that workstation. In still other embodiments, fraud detection is performed at multiple locations, such as locally at the workstation and remotely at the security center.

Potential fraudulent activity may be determined by the fraud detection unit (e.g., fraud detection unit 266) by comparing the activity log of the agent and the converted transcript of the verbal communication with a behavior model 265 of historical and/or ideal agent activities performed in similar circumstances. For example, a keyword search or contextual analysis may be performed on the transcript to determine a likely purpose of the call, or the behavior model 265 may be specific to a particular client or client line of business. Once potentially fraudulent activity is detected, preventative and/or corrective security measures may be taken to eliminate or minimize the risk to the affected customer. The appropriate security measure(s) to be taken may be determined using a policy engine 267 that considers a number of factors and selects which, if any, security measure(s) to perform in response to the detected potentially fraudulent activity.

Figure 3:
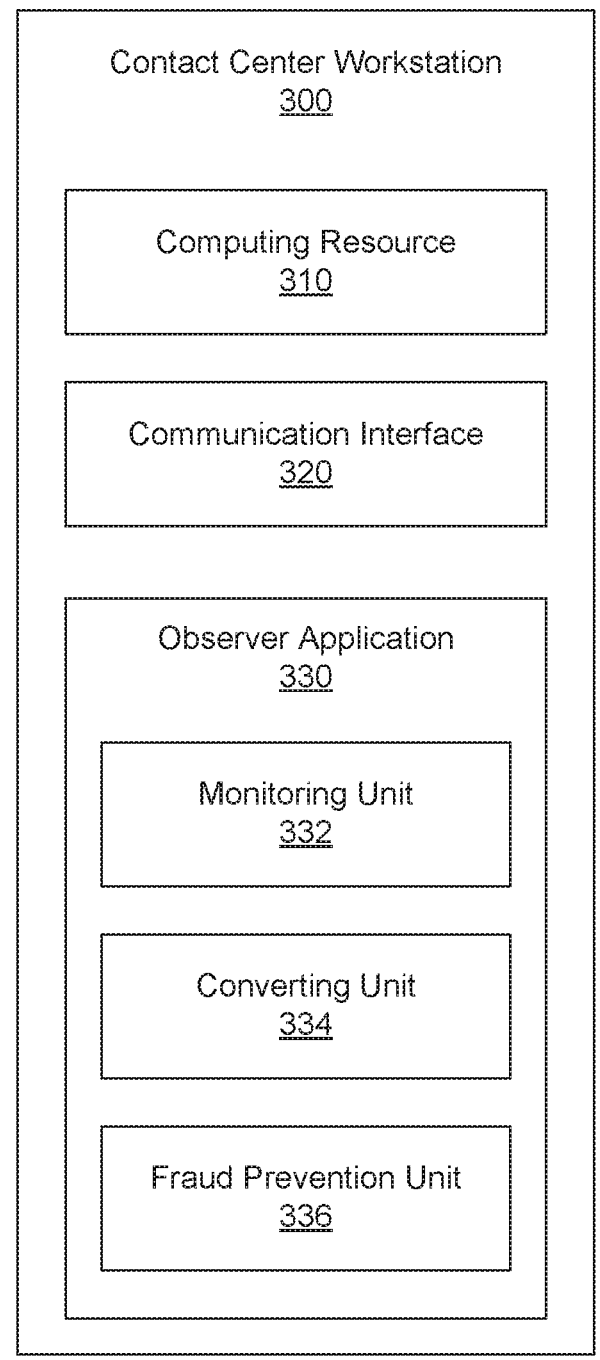
FIG. 3 is a block diagram of components of a contact center workstation that is configured for monitoring the activity of a contact center agent in order to identify potential fraudulent activity performed by the agent, in accordance with one embodiment of the present disclosure.

FIG. 3 is a component diagram of a contact center workstation 300 configured for monitoring the activity of a contact center agent and the verbal communication exchanged between the contact center agent and a caller in order to identify potential fraudulent activity performed by the agent, in accordance with one embodiment of the present disclosure. According to one or more embodiments, Workstation 300 may be implemented as, for example, system 100 of FIG. 1 (described above) for the purposes of monitoring activity of a corresponding agent and/or workstation to identify potential fraudulent activity and to perform additional actions once the activity is detected. Further, workstation 300 is representative of workstations 230A-N in FIG. 2.

In one or more embodiments, Workstation 300 is configured to enable real-time monitoring, fraud detection, and fraud prevention, as implemented through embodiments of the present invention. For instance, different components of workstation 300 operate together to monitor communication and track agent activity in order to detect and document fraudulent activity, and to take subsequent action in order to prevent future fraud.

As previously described, each workstation in a contact center may be organized as a scalable unit, and contains essential components to enable an attending agent to communicate with a customer, and to provide services to that customer on behalf of a client. For instance, communication resource 320 allows for the agent to communicate with the customer, and may include a telephone or other voice or text based device. According to further embodiments, communication resource 320 may also include an internet-based communication interface that allows the agent to communicate via Internet-based protocols to similarly networked computing devices (e.g., computing device used by a customer). As depicted, workstation 300 also includes a multi-purpose computing resource 310.

In one implementation, computing resource 310 is configured to access client resources. For example, when handling or involved in an interaction with a customer (e.g., handling a call from a customer), the agent acting on behalf of a client and through the computing resource 310 has access to client based resources (e.g., applications, databases, etc.) that contain personal and identifiable information related to the customer. In one or more embodiments, the information may be accessed from remotely located data storage devices, accessible to an application executing on the workstation 300 via a secured network connection (e.g., the communication resource 320).

In addition, computing resource 310 may be configured to enable primary or supporting communication with a customer. For instance, computing resource 310 may be used for enabling or facilitating simultaneous access of a website by the customer and the agent. According to further embodiments, computing resource 310 may be used in conjunction with a video camera and/or microphone to enable and facilitate video conferencing functionality between a customer and the agent. Additionally, capabilities of computing resource 310 may be utilized to implement monitoring of communication between a customer and an agent, tracking of agent activity on computing resource 310, detection of fraud, and/or prevention of fraud independent of or in conjunction with other components in workstation 300, or remotely located components or devices (e.g., located at a security center).

Workstation 300 also includes an observer application 330, which is configured to monitor the communication between a customer and an agent and track activity of components within workstation 300 and/or activity of the corresponding agent alone or in conjunction with those components. In implementations, observer application 330 can be executed by the computing resource 310, and represents an instantiation of a distributed application. In one or more embodiments, observer application 330 includes a monitoring unit 332 configured to detect and record verbal communication between an agent and a customer during a contact (call) session. In one or more embodiments, the verbal communication may be recorded in a plurality of discrete strings or snippets of conversation and stored in a buffer in the workstation 300, for example.

Monitoring unit 332 is also configured to track the activity performed by the attending agent during the session or portions of the session, such that a usage log can be generated indicating at what times the communication resource 320 was in use, or a customer's data was accessed, and any activity performed by the agent in any field of any co-executing application, and/or on operating system level. The monitoring unit 332 is thus able to track when computing resource 310 is connects to and disconnects from (e.g., logs-in to and logs-out) the contact center and/or resources at a corresponding workstation, when computing resource 310 is executing an application of a client, when computing resource 310 is accessing a particular resource of the client, and any other quantifiable activity that is conducted on the computing resource 310.

According to one or more embodiments, monitoring unit 332 is able to track the status of an attending agent at workstation 300 based on input provided to the computing resource 310 by the agent. For example, monitoring unit 332 is able to determine the availability of the attending agent based on the log-in status of the computing resource 310. In other instances, monitoring unit 332 is able to track when the agent is on a break, or out to lunch, based on the history of activity the computing resource 310, or based on log-in status provided by the agent to the resource 310.

As depicted in FIG. 3, Observer application 330 also includes converting unit 334. In one or more embodiments, the recorded conversation between the agent and the customer is received in converting unit 334 and a textual representation is generated by the converting unit 334. The textual representation may include, for example, a transcript of the conversation. In one or more embodiments, the textual representation is generated using an automated speech recognition (ASR) system. According to one or more embodiments, a textual representation may be generated for all of the (detected) recorded conversation for a session. According to alternate embodiments, the textual representation may be generated over a plurality of snippets. In one or more embodiments, the snippets may be organized based on a duration of time, or whenever pauses in conversation that exceed a certain threshold are detected. In still further embodiments, the snippets may be organized by parsing the recording of the conversation or the textual representation of the conversation and applying contextual analysis to the textual representation to identify natural pauses or breaks in conversations.

Based on the information collected by the observer application 330, further analysis can be performed. For example, information collected from one or more workstations can be used to establish a baseline of agent activity specific to an individual agent, to agents as a group, for a specific purpose (e.g., sale of a product, service request), and/or for a specific client or a specific line of business of a client. The information can also be used to establish a baseline of frequent or common fraudulent acts. Illustrations of baseline data include average time handling or being involved in an interaction with a customer, average time assisting a customer on a call, average time accessing a client resource, the number of times a client resource is accessed, the time an agent has placed customers on hold, the data or input an agent enters, the application or information the agent accesses, etc. This information may be aggregated to establish appropriate or optimal behavior of an agent among a group of agents, for a specific task or purpose or for a specific client or line of business based on a comparison to the statistical average. This information may also be used to determine whether potential fraudulent activity has occurred, such as when agent activity falls outside of the statistical norm or performs actions that are not within the scope of normal tracked activity for the purpose/client/line of business, as will be described more fully below.

As depicted, observer application 330 also includes a fraud detection unit 336. Based on the information collected by monitoring unit 332, fraud detection unit 336 can determine when certain activities, or combination of activities performed on or by the components of workstation 300 and/or the attending agent may constitute potentially fraudulent activities that are being performed by the agent. For example, as determined by fraud prevention unit 336, the information collected may match certain rules or patterns of activities known to occur when fraud is preformed. In other instances, potential fraudulent activity may be detected when agent activity falls outside the statistical norm of a group of agents, that particular agent, or for the determined purpose/client/line of business.

According to one or more embodiments, fraud prevention unit 336 determines the potentially fraudulent activity by continuously comparing the tracked agent activity (e.g., as a log of agent activity) and the converted textual representation of the conversation between the agent and the customer of a call session with a behavior model that aggregates data from similar interactions under the same or substantially similar conditions/parameters. As such, fraud prevention unit 336 may provide notification that potential fraudulent activity is being conducted at the workstation 300 by an agent. For example, notification may be provided through a chart of the contact center.

In one or more embodiments, the analysis performed to detect potential fraudulent activity may be performed by the fraud prevention unit 336 at the local workstation, a remote fraud prevention unit (e.g., by a behavior engine executing at a remote server such as the security center 260 described above with respect to FIG. 2), or a combination of the local and remote fraud prevention units. Where the analysis is performed by a remotely executing behavior engine, the activity log and the textual representation may be transmitted from the agent's workstation to the (remotely executing) behavior engine. According to one or more embodiments, the transmission of the activity log and textual representation, the analysis of the transmitted materials, and detection of potential fraud may occur in real-time. Alternatively, the detection of potential fraudulent behavior may be performed during a post occurrence period of analysis.

When potential fraudulent activity is detected, one or more security protocols may be enacted to enforce one or more security policies. These policies may include performing security actions such as: flagging the monitored agent activity as a potential fraudulent activity; generating a notification to a system administrator; generating a report of potential fraudulent activity to the system administrator; monitoring additional agent activity; and suspending further agent activity at the workstation. According to one or more embodiments, the specific security action(s) selected to be performed may be determined during or as a result of the analysis to detect potential fraudulent activity, and may be based on, for example, the likelihood or certainty of fraudulent activity having occurred or about to occur, the severity or exposure to risk of the detected potential fraudulent activity, the agent's employment history at the contact center, the client or line of business, etc.

Figure 4:
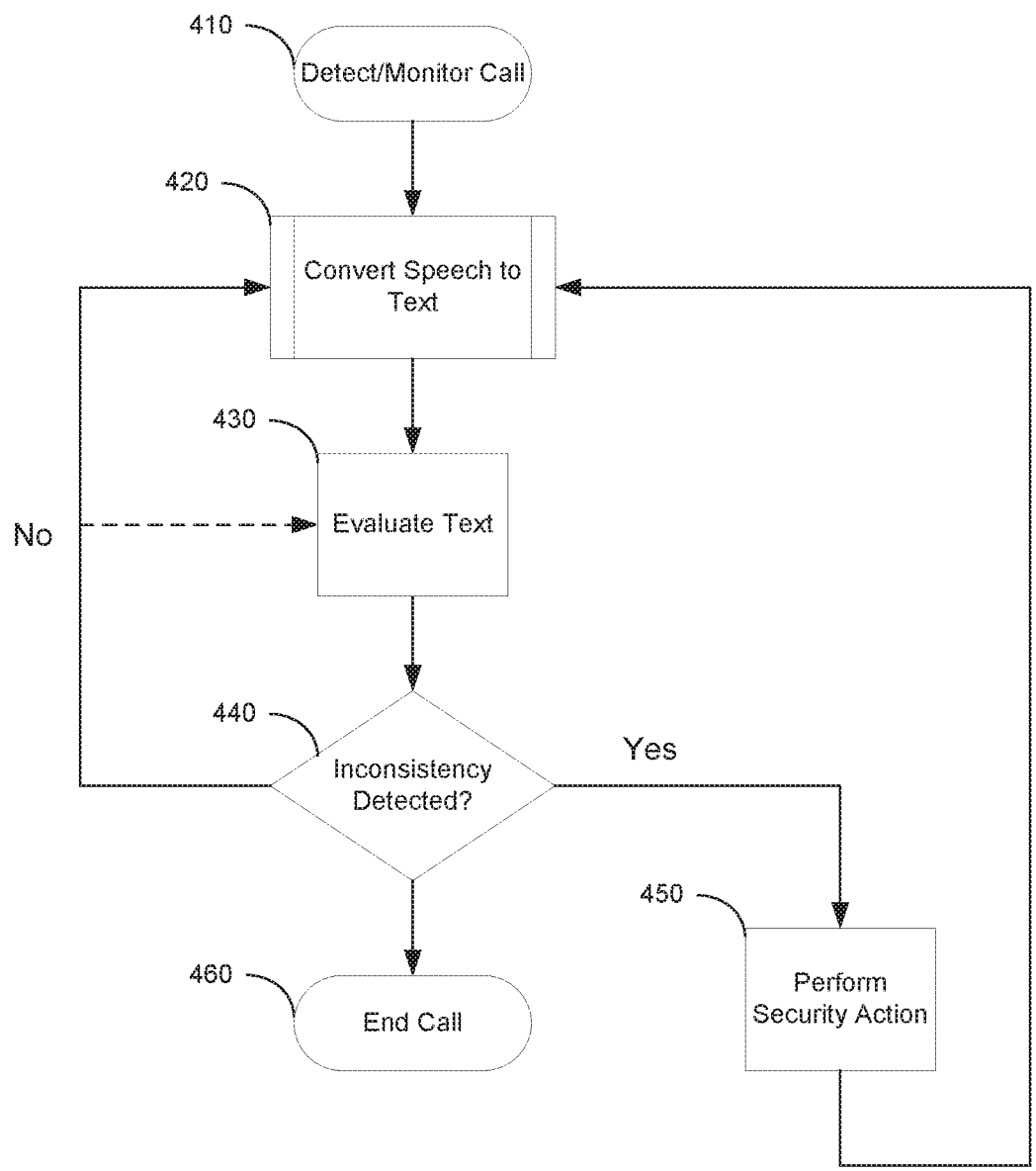
FIG. 4 is a flow diagram illustrating a method for monitoring call activity to detect fraudulent activity and to take preventative measures once the potential fraudulent activity is detected, in accordance with one embodiment of the present disclosure.

FIG. 4 is a flow diagram 400 illustrating a method for monitoring agent activity for potential fraudulent behavior and performing preventative measures once the potentially fraudulent activity is detected, in accordance with one or more embodiments of the present disclosure. Steps 410-460 describe exemplary steps comprising the process 400 depicted in FIG. 4 in accordance with the various embodiments herein described. In one embodiment, the process 400 is implemented at least in part as computer-executable instructions stored in a computer-readable medium and executed in a computing device. According to various embodiments, the method outlined in flow diagram 400 may be implemented and/or executed by one or more components of the systems 100, 200, and 300 of FIGS. 1-3, respectively.

At 410, the method includes detecting a call session initialization. The call session may comprise, for example, an inbound call initiated by a customer and received at a workstation assigned to an agent and may be received via a telephone device via a voice network (e.g., network 250 of FIG. 2), and/or as an Internet-based communication via a network interface to the Internet (e.g., network 255 of FIG. 2). Alternately, the call session may also comprise an outbound call, initiated either by the agent (e.g., by dialing a phone number), or an automated system that performs the dialing (or other addressing) and facilitates a connection between the agent and the customer. According to one or more embodiments, the call (either inbound or outbound if initiated automatically by the system) may be received in a shared pool or queue of calls, accessible to any one of a number of agents at a corresponding number of workstations.

Once received at step 410, the call session is monitored. Monitoring of the call session consists of, for example, tracking the telephony or computer telephony interface (CTI) state of the interface used to connect an agent with the customer, monitoring the verbal communication (conversation) taking place between the agent and the customer during the call session, and tracking the activity of the agent on any applications executing on the workstation. In one or more embodiments, the audio communication may be monitored using voice and video-teleconferencing communication protocols, such as the Real0time Transport Protocol (RTP), and/or Session Initiation protocol (SIP). The specific protocols used may themselves adhere to industry standards (e.g., the H.323 standard for call signaling and control). The audio communication is captured according to the applicable protocol(s), and data packets representing the communication are generated and transmitted to the receiving device and user. According to one or more embodiments, the transmitted data packets may be intercepted initially and converted to text (see step 420 below) prior to forwarding to the receiving device (and user.

As previously discussed, the monitoring allows for the collection of information related to the activities of the agents and/or activities being performed on resources utilized by the agents. In one embodiment, the electronic activity of the agents is monitored (e.g., computer activity, phone activity, etc.). Further, the monitored information may be collected at a centralized location for storage and analysis. In one implementation, the method includes monitoring a first agent at a first workstation, and in particular monitoring the interactions of the agent with the resources (e.g., computing resource) of the workstation. In addition, agent interaction with a client resource may be monitored. For example, the interaction with a client database is monitored. Further, agent interaction with the communication system is monitored to determine when the agent is handling or is involved in an interaction (e.g., on a call), and whether the agent is available to help a new customer through another interaction (e.g., take another call).

In one implementation, the monitoring is continuous, wherein the monitoring is performed when the agent is handling or is involved in an interaction (e.g., handling calls), and when the agent is not handling or is not involved in an interaction. That is, all activity of the agent and/or activities being conducted on the resources of the workstation are monitored. In other implementations, the monitoring is periodic or randomly performed. For example, only a statistical sample is needed to determine fraudulent activity, and rather than wasting resources, the monitoring is performed on a less than continuous basis.

At step 420, the verbal communication is converted to a textual representation. In one or more embodiments, a transcript of the conversation is generated using automated speech recognition (ASR) techniques (e.g., software). According to one embodiment, the conversation can be recorded and stored in real-time (e.g., in a buffer in memory), and the conversion is generated from the recorded data in the buffer. The conversion may be performed for the conversation according to pre-determined increments (e.g., 10, 30, 60 seconds), such that once the conversion is performed incrementally. The conversation and ensuing conversion may be generated by buffering durational increments after the detection of pre-defined keywords used in the conversation. In alternate embodiments, the conversation may be converted in real-time (e.g., as a stream) for all or portions of the conversation. According to additional embodiments, the conversation may be recorded and transmitted to be converted remotely (e.g., at the security center 260 of FIG. 2), either in its entirety (after the call has completed), or in snippets at pre-defined intervals.

At step 430, the textual representation (e.g., transcript) of all or portions of the communication between the agent and the customer generated in step 420 is evaluated with a log of the agent's activity that was tracked at step 410. In one or more embodiments, evaluation of the text and activity log is performed in a behavior engine implemented as part of an monitoring or observation application and instantiated in a server communicatively coupled to one or more workstations at one or more contact centers. The behavior engine evaluates the input data of the converted text and activity log by comparing the input data to a behavior model, that includes statistical and/or approved and/or known potentially fraudulent behavior according to one or more parameters. These parameters may include, for example, historical and/or approved behavior responsive to scenarios determined to be under similar circumstances (e.g., defined purposes), or for specific products, services, or clients. According to one or more embodiments, a specific product, service, client, or client line of business may have a unique corresponding behavior model.

In one or more embodiments, evaluation may be performed by analyzing the conversation between the agent and the customer to determine statistically probable topics. For example, a keyword search may be performed on common purpose-driven terms, such as "address," "credit card number," or "issue." Other examples of potential keywords of interest include, but are not limited to, return merchandise authorization (RMA) information, medical prescriptions, travel bookings, account numbers, etc. The converted text proximate to the searched-for terms may be further analyzed to more accurately determine the purpose of the call or a particular topic of the conversation. The actions of the agent responsive or corresponding to the terms are referenced in the activity log (e.g., via time stamping) are then evaluated in view of the conversation.

In one or more embodiments, the actions are evaluated according at the application and field level. Thus for example, the application and field within the application used by an agent to enter a sequence of numbers provided by a client in response to the phrase "credit card" is tracked and evaluated according to both statistically normal, approved, and/or known potentially fraudulent activity. According to alternate embodiments, evaluation may be performed by applying a contextual analysis and/or pattern matching of the converted text and agent activity relative to a behavior model may be performed in addition to, or in lieu of a keyword search.

At step 440, any inconsistencies between the actions of the agent (as recorded in the activity log) and the corresponding authorized and/or statistically normal actions according to the behavior model are detected during the evaluation performed at step 430. If no inconsistencies are detected, the process returns to step 420 for embodiments wherein the text conversion and evaluation are performed in real-time (e.g., streamed) during the call, or to step 430 for the embodiments wherein the text conversion is performed some time before the evaluation (e.g., using a buffer, or a recorded portion). However, the process proceeds to step 460 and terminates when the entire conversation (or evaluated portion of the converted conversation) completes without detecting any inconsistencies between the agent's actions and approved behavior according to the behavior model.

When an inconsistency is detected, or, alternately, if an action is detected that is known or likely to be potentially fraudulent the process proceeds to step 450 to perform security actions. Various techniques may be implemented to determine that activity of an agent is potentially fraudulent, and requiring further attention. For instance, in one embodiment, an agent may be engaged in suspicious activity that is generally indicative of fraudulent activity. In particular, when an agent is accessing personal and identifiable information (e.g., through a client database) related to a customer of a client, but is not helping the customer (e.g., not on a call with customer), then that activity is suspicious. This activity may be identified as matching the criteria, and leading to a determination that potential fraudulent activity may have been conducted by the agent. Further investigation may be necessary to determine if actual fraud has occurred. On the other hand, if the monitoring determines that the positioned agent is accessing a client database for customer information, and that the agent is currently helping that customer related to the accessed information, then the activity and access to the client database is authorized.

The determination that potential fraudulent activity has occurred may be performed at a security center that is centralized to a plurality of workstations of a contact center. In particular, the security center is configured to receive a plurality of information related to the activities of agents and/or activities being performed on resources of the plurality of workstations. That information, collected at each of the workstations, is then delivered over a communication network to the security center for further analysis, and more specifically for determining when potential fraudulent activity has occurred.

For example, the determination that potential fraudulent activity has occurred is based on whether the information relating to activities of an agent and/or activities being performed on resources of a workstation violate any pre-defined or pre-determined rules (e.g., a behavior model). The rules may be defined by one or more parameters, and/or criteria in the behavior model. More particularly, it may be determined that potential fraudulent activity has occurred when the information indicates a violation of a rule. As an illustration, the rule may define a baseline of transactions, actions, or activities performed by one or more agents in conjunction with the use of workstation resources (e.g., phone, computing resource, etc.). For example, the baseline may be defined by a statistical average in relation to an activity associated with the agent and/or the plurality of agents. In addition, the baseline may be directed or correspond to at least a first activity. For example, the baseline may describe the average number of outbound calls made by agents over a predefined period of time (e.g., 1 hour, 2 hour, daily shift, etc.). In another example, the baseline may describe the number of times an agent places customers on hold over a period and/or the duration of the hold time each time a customer is placed on hold.

An outlier condition that is performed by an agent may be monitored and discovered, wherein the outlier condition lies outside of the baseline. That is, the outlier exhibits unusual patterns of activity. If the outlier condition satisfies the rule (e.g., parameters and/or criteria), then a determination can be made that potential fraudulent activity has occurred. Further, the outlier condition may be matched with known fraudulent activity that is associated with the rule. Because outliers may happen upon occasion, unusually high numbers of outliers may be an indication of fraud. Additional investigation is necessary to determine whether there is actual fraud.

In one example, potential fraud activity by an agent occurs when there are excessive caller hold times, when compared to a statistical average of a plurality of agents in the contact center. An agent who is recorded as having excessive hold times, may be attempting to fraudulently access personal and identifiable information while having an active phone call with a customer. In this scenario, in an effort to beat an anti-fraud solution, the contact center agent might put a valid phone customer on hold and then access another customer's personal and identifiable information. In still another example, potential fraudulent activity by an agent occurs when an agent generates an outbound call at a time that is incongruous with actions of other agents. That is, the typical pattern of the agents in the contact center shows that agents are handling inbound calls. Another pattern may show that the individual agent over a historical period has only handled inbound calls. The contact center agent might try to beat an anti-fraud solution by establishing a fake "phone call" simply by making an outbound call, and then fraudulently accessing customer personal and identifiable information. In another example, potential fraudulent activity by an agent occurs when an agent is accessing forms and exhibits characteristics outside of a statistical average including actions of other agents or that particular agent. For example, the agent's duration within identified forms or pages of the application is compared to the normal baseline based upon statistical averages of all contact center agents to determine any deviation.

At step 450 and in response to the detected potentially fraudulent activity, one or more security protocols may be enacted to enforce one or more security policies for the agent and/or at the workstation of the agent. The identity of the workstation may be determined, for example, from the information used to determine that potential fraudulent activity has occurred. For example, identifying information of a computing resource upon which the activity occurred may be cross referenced to determine the corresponding workstation within which the activity was performed. Upon identification, additional information related to the workstation may be gathered, such as determining the agent who is scheduled to work at the time when the potential fraudulent activity occurred. Security policies may include performing security actions such as: flagging the monitored agent activity as a potential fraudulent activity; generating a notification to a system administrator; generating a report of potential fraudulent activity to the system administrator; monitoring additional agent activity; and suspending further agent activity at the workstation. According to one or more embodiments, the specific security action(s) selected to be performed may be determined during or as a result of the analysis to detect potential fraudulent activity, and may be based on, for example, the likelihood or certainty of fraudulent activity having occurred or about to occur, the severity or exposure to risk of the detected potential fraudulent activity, the agent's employment history at the contact center, the client or line of business, etc.

Figure 5:
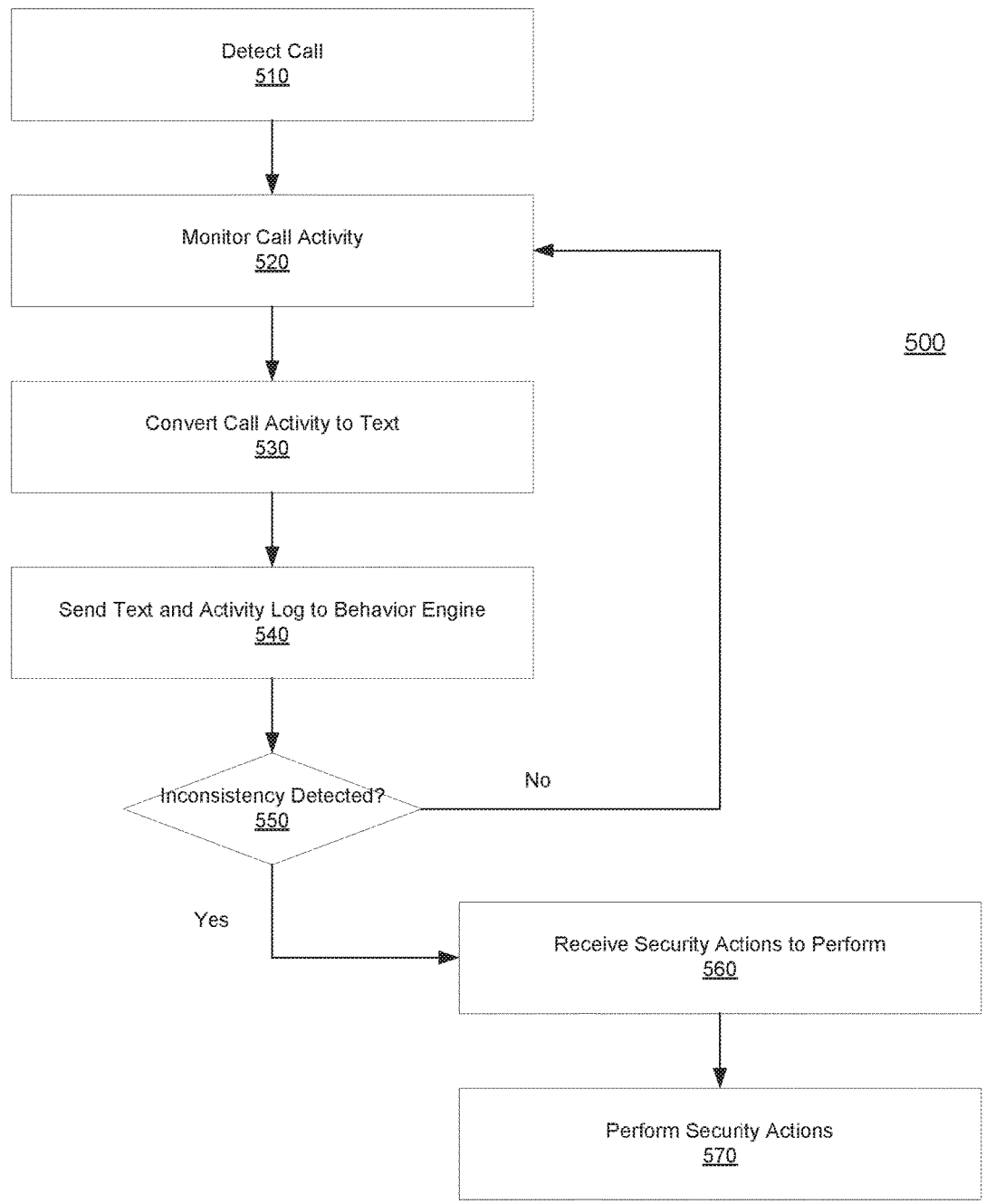
FIG. 5 is a flow diagram illustrating a method for monitoring call activity at a workstation to detect fraudulent activity and to take preventative measures once the potential fraudulent activity is detected, in accordance with one embodiment of the present disclosure.
Figure 6:
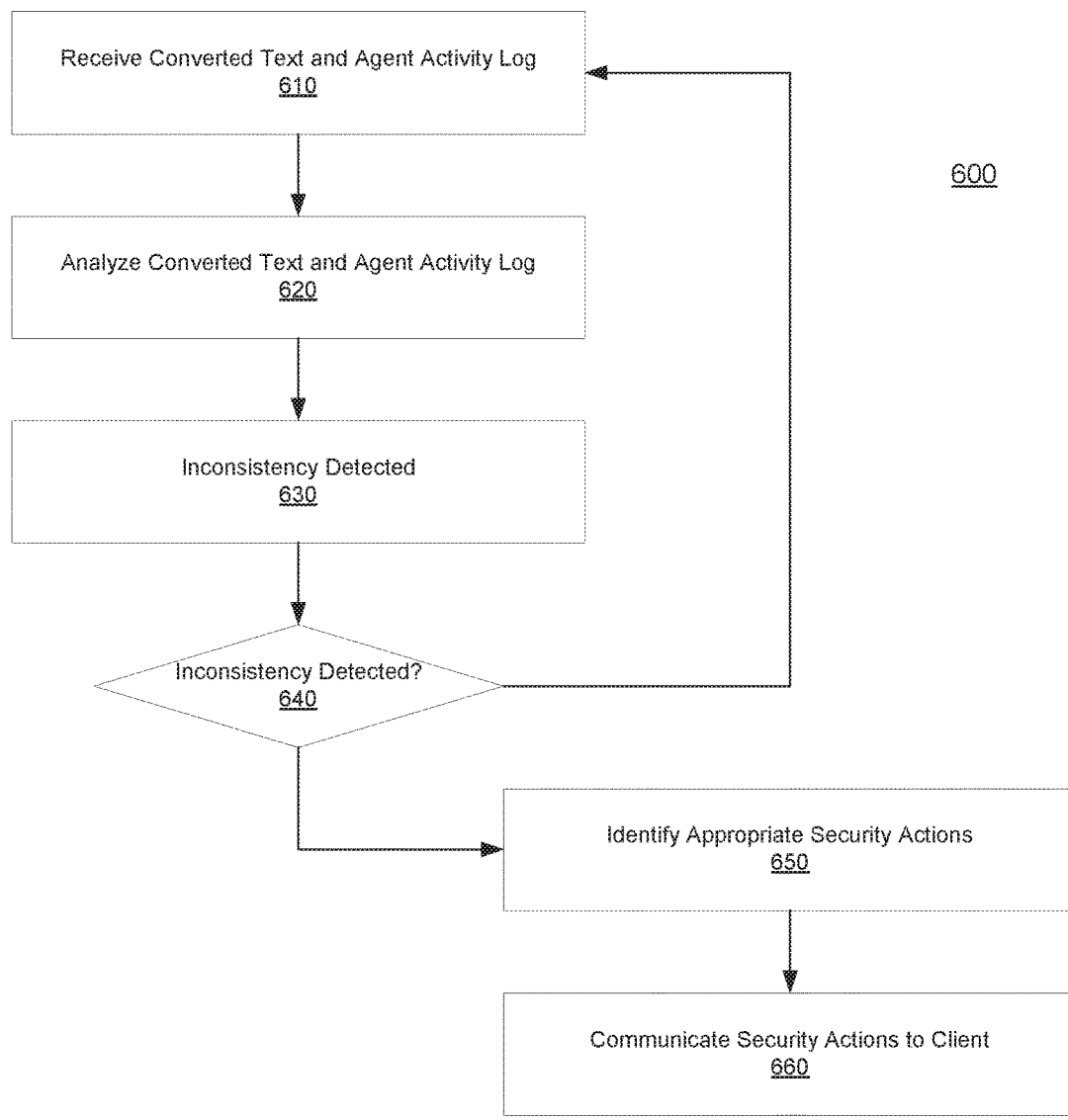
FIG. 6 is a flow diagram illustrating a method for evaluating monitored call activity to determine the likelihood of potentially fraudulent activity, in accordance with one embodiment of the present disclosure.

FIGS. 5 and 6 depict processes 500 and 600 performed by a client computing device and a security center, respectively, to detect and prevent potentially fraudulent behavior using context-based rules analysis. In one or more embodiments, process 500 depicts some or all of the process 400 described above with respect to FIG. 4 that is performed in the workstation of the agent during a monitored call. Similarly, in one or more embodiments, process 600 depicts some or all of the process 400 described above that is performed in a security center (e.g., security center 260 of FIG. 2) remotely located from the workstation. Steps 510-570 describe exemplary steps comprising the process 500 depicted in FIG. 5 in accordance with the various embodiments herein described. Steps 610-660 describe exemplary steps comprising the process 600 depicted in FIG. 6, in accordance with the various embodiments herein described. In one embodiment, one or both of the processes 500 and 600 is implemented at least in part as computer-executable instructions stored in one or more computer-readable mediums and executed in one or more computing devices. According to various embodiments, the methods outlined in flow diagrams 500 and 600 may be implemented and/or executed by one or more components of the systems 100, 200, and 300 of FIGS. 1-3, respectively.

In one or more embodiments, process 500 may be performed by a monitoring or observation application executing in a computing device of the workstation. Step 510 corresponds to step 410 described above, and begins by detecting an initialization of a call session at a workstation (e.g., via telephone or Internet-based communication channel) corresponding to an agent. According to one or more embodiments, a call session initialization may be detected by determining a change in the telephony state of a workstation or workstation component used by the agent. Once a call session is detected, monitoring of the call activity begins at step 520. As discussed above with respect to step 410, monitoring of the call activity includes tracking agent actions during the call. At step 530, data packets capturing the voice activity (e.g., verbal communication/conversation between the agent and customer during the call session are generated according to one or more internet-based transmission protocols (e.g., SIP/RTP) and converted to text. As described above, the conversion to text may be performed automatically, and either in real-time (e.g., as a stream), in snippets according to a pre-defined intervals, or retroactively from a recording of portions or the entirety of the conversation.

At step 540, the converted text and the log of the agent's activity are sent to a behavior engine. In one or more embodiments, the behavior engine may be implemented as part of a corresponding security/observation application executing in a communicatively coupled server computing device (e.g., at a remote security center). The converted text and agent activity log are processed and analyzed in the remotely executing behavior engine, and the local instantiation of the monitoring application is notified at step 550 whenever inconsistencies are observed between expected behavior responsive to the converted text (based on a behavior model) and corresponding actions in the agent activity log. Additionally, the activity log may also be analyzed to detect any actions that fall outside of statistical norms or actions identified (e.g., flagged) as consistent with fraudulent or potentially fraudulent behavior. If no notification of inconsistent or potentially fraudulent behavior is received from the behavior engine, the process continuously repeats from step 520 for each monitored interval, period of interest, or incident of call activity over the remainder of the call.

On the other hand, when a notification is received at step 550, additional security actions may also be received at 560 that have been selected as appropriate actions to perform in response to the detected inconsistent and/or potentially fraudulent behavior. Otherwise, a security prescription (e.g., a list of heightened security actions) may be generated (e.g., by a locally executing security engine) in response to the notification and/or information received from the behavior engine in response to the detected activity of interest. At step 570, the security prescription (e.g., list of security actions) received from the behavior engine or generated at step 560 is performed to further limit the agent activity and/or to collect additional information to evaluate. According to further optional embodiments, data collected while monitoring the activity of the agent during the conversation and the textual representation of the conversation may be distilled and added to the behavior model, thereby adding an additional data point to use to evaluate further behavior in similar circumstances.

In one or more embodiments, process 600 may be performed by a observation application implementing a behavior engine and executing in a computing device of a security center. At step 610, a textual representation (such as a transcript) of all or a portion of a voice communication between an agent and a customer during a monitored call and a log of the activity performed by the agent during the call is received in a monitoring and/or security application executing in a computing system, such as a server. In one or more embodiments, Step 610 may be performed in response to the performance of step 510 of process 500 described above in a communicatively coupled client computing device. In alternate embodiments, a recording of all or portions of the voice communication may be received in addition to, or in lieu of the textual representation, whereby step 610 includes converting the recording to a textual representation (e.g., using automated speech recognition techniques).

At step 620, the text received (or converted) and the activity log received at step 610 is analyzed in a behavior engine by comparing the actions in the activity log in view of the verbal communication to a behavior model. In one or more embodiments, the behavior model may comprise a plurality of behavioral rules that map one or more text inputs to one or more action outputs. When an action in the activity log is determined to not correspond to any of the behavioral associations (e.g., an inconsistent action), or, alternately, when an action in the activity log is determined to match a behavioral rule flagged as indicative of a potentially fraudulent activity, the action is identified at step 640, flagged in the system as potentially fraudulent, and the process proceeds to step 650. When no inconsistency or potentially fraudulent activity is detected, the process repeats itself, beginning at step 610.

At step 650, appropriate security actions to be performed (either by the security center, by a system administrator, by an agent supervisor, or by the monitoring application executing in the client computing device of the agent's workstation) are identified. Identification of appropriate security actions may be performed using a security engine and/or by applying a set of pre-defined security rules that map certain parameters of the potentially fraudulent activity to security actions. The parameters considered may include, but are not limited to, the type or character of the potentially fraudulent act, a frequency of the act by other agents, a frequency of the act by the specific agent, the specific client, the specific product or service, the specific line of business, the egregiousness or severity of the act, the risk to the customer and/or a client, the availability of security and/or system administrators, the criminality of the act, and the potential of deterring future similar actions in response to one or more security actions. Finally, the security actions determined at step 650 are communicated to the workstation of the agent at step 660. Wherever possible, any actions that can be performed or are prescribed to be performed in the monitoring application executing in the security center may also be performed at step 660.

Thus, according to embodiments of the present invention, method and systems for monitoring call activity using converted speech to text to detect and prevent fraud within a contact center are disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments.

What is claimed is:

1. A method for performing fraud detection at a workstation, the method comprising:
   monitoring call activity of a call session conducted by an agent, the call activity comprising:
      i) a monitored verbal communication between the agent and a third party; and
      ii) a log of agent activity performed by the agent and responsive to the verbal communication;
   converting the monitored verbal communication to a textual representation thereof;
   analyzing the log of agent activity using a behavior engine;
   detecting an inconsistency between the monitored verbal communication and the log of agent activity based on the behavior engine; and
   performing one or more security actions in response to detecting the inconsistency.

2. The method according to claim 1, wherein the agent comprises an agent of a contact center.

3. The method according to claim 1, wherein the monitoring call activity comprises monitoring at least one of:
   a telephony state of the call session; and
   a computer telephony integration (CTI) state of a computing device used by the agent during the call session.

4. The method according to claim 1, wherein the monitoring call activity comprises automatically determining a purpose of the call session.

5. The method according to claim 4, wherein the behavior engine comprises one or more behavior models, each behavior model comprising a pre-defined set of behavior rules corresponding to the purpose of the call session.

6. The method according to claim 5, wherein at least one of the one or more behavior models corresponds specifically to at least one of a business entity, and a line of business corresponding to the business entity.

7. The method according to claim 1, wherein the monitoring activity comprises tracking agent activity in one or more applications executing at a workstation corresponding to the agent.

8. The method according to claim 7, wherein the workstation comprises a computing system.

9. The method according to claim 7, wherein the one or more security actions comprises at least one of:
   flagging the monitored agent activity as a potential fraudulent activity;
   generating a notification to a system administrator;
   generating a report of potential fraudulent activity to the system administrator;
   monitoring additional agent activity; and
   suspending further agent activity at the workstation.

10. The method according to claim 1, wherein the analyzing comprises:
    parsing the textual representation to identify one or more words;
    performing a keyword search on the one or more identified words from the textual representation;
    referencing a behavior model to determine appropriate actions corresponding to one or more results from the keyword search; and
    comparing the appropriate actions to the log of agent activity.

11. The method according to claim 1, wherein the analyzing comprises:
    parsing the textual representation to identify one or more phrases;
    performing a contextual analysis on the one or more identified phrases from the textual representation;
    referencing a behavior model to determine appropriate actions corresponding to one or more results from the contextual analysis; and
    comparing the appropriate actions to the log of agent activity.

12. The method according to claim 1, wherein the converting the monitored verbal communication comprises:
    recording the monitored verbal communication as a plurality of snippets, each snippet having a maximum duration;
    storing the plurality of snippets in a buffer;
    performing automatic speech recognition on the plurality of snippets; and
    generating a plurality of converted speech to text phrases based on the plurality of snippets.

13. A method for performing fraud detection in a contact center, the method comprising:
    receiving, from a remote client computing device, a converted textual representation of a monitored verbal communication between an agent and a third party, and a log of agent activity performed by the agent and responsive to the verbal communication;
    analyzing the log of agent activity and the converted textual representation in a behavior engine;
    detecting an inconsistency between the converted textual representation and the monitored agent activity;
    identifying one or more security actions for the remote client computing device to perform in response to detecting the inconsistency; and
    communicating the one or more security actions to the remote client computing device to perform.

14. The method according to claim 13, wherein the analyzing comprises automatically determining a purpose of the monitored verbal communication based on at least one of the log of agent activity and the converted textual representation.

15. The method according to claim 14, wherein the behavior engine comprises one or more behavior models, each behavior model comprising a pre-defined set of behavior rules corresponding to the purpose of the monitored verbal communication.

16. The method according to claim 13, wherein the log of agent activity comprises tracked agent activity in one or more applications executing at a workstation corresponding to the agent.

17. The method according to claim 13, wherein the one or more security actions comprises at least one of:
   flagging the monitored agent activity as a potential fraudulent activity;
   generating a notification to a system administrator;
   generating a report of potential fraudulent activity to the system administrator;
   monitoring additional agent activity; and
   suspending further agent activity at a workstation corresponding to the agent.

18. The method according to claim 13, wherein the analyzing comprises:
   parsing the textual representation to identify one or more words;
   performing a keyword search on the one or more identified words from the textual representation;
   referencing a behavior model to determine appropriate actions corresponding to one or more results from the keyword search; and
   comparing the appropriate actions to the log of agent activity.

19. The method according to claim 1, wherein the analyzing comprises:
   parsing the textual representation to identify one or more phrases;
   performing a contextual analysis on the one or more identified phrases from the textual representation;
   referencing a behavior model to determine appropriate actions corresponding to one or more results from the contextual analysis; and
   comparing the appropriate actions to the log of agent activity.

20. A method for performing fraud detection at a workstation of a contact center, the method comprising:
   detecting an initialization of a call session at a workstation of an agent;
   monitoring call activity corresponding to a call session, the call activity comprising a monitored verbal communication between the agent and a third party;
   tracking agent activity performed by the agent and responsive to the verbal communication in a log of agent activity;
   converting the monitored verbal communication to a textual representation of the monitored verbal communication;
   sending the textual representation and the log of agent activity to a behavior engine executing in a communicatively coupled server;
   receiving a notification of a detected inconsistency between the monitored verbal communication and the log of agent activity from the behavior engine and one or more security actions to perform in response to the detected inconsistency; and
   performing the one or more security actions in response to receiving the notification of the detected inconsistency.

* * * * *